United States Patent
Kadambi et al.

(10) Patent No.: US 9,778,363 B2
(45) Date of Patent: Oct. 3, 2017

(54) METHODS AND APPARATUS FOR CODED TIME-OF-FLIGHT CAMERA

(71) Applicants: Achuta Kadambi, Cambridge, MA (US); Refael Whyte, Hillcrest (NZ); Ayush Bhandari, Cambridge, MA (US); Lee Streeter, Hamilton (NZ); Christopher Barsi, Exeter, NH (US); Adrian Dorrington, Auckland (NZ); Ramesh Raskar, Cambridge, MA (US)

(72) Inventors: Achuta Kadambi, Cambridge, MA (US); Refael Whyte, Hillcrest (NZ); Ayush Bhandari, Cambridge, MA (US); Lee Streeter, Hamilton (NZ); Christopher Barsi, Exeter, NH (US); Adrian Dorrington, Auckland (NZ); Ramesh Raskar, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 423 days.

(21) Appl. No.: 14/523,708

(22) Filed: Oct. 24, 2014

(65) Prior Publication Data
US 2015/0120241 A1    Apr. 30, 2015

Related U.S. Application Data

(60) Provisional application No. 61/895,132, filed on Oct. 24, 2013.

(51) Int. Cl.
*G01S 17/89* (2006.01)
*G01S 17/32* (2006.01)
*G01S 7/491* (2006.01)

(52) U.S. Cl.
CPC ............ *G01S 17/89* (2013.01); *G01S 7/4915* (2013.01); *G01S 17/32* (2013.01)

(58) Field of Classification Search
CPC ........ G01S 17/89; G01S 17/32; G01S 17/325; G01S 17/42; G01S 7/4915; G01S 7/4918
See application file for complete search history.

(56) References Cited

U.S. PATENT DOCUMENTS 7,212,663 B2    5/2007  Tomasi
2014/0368728 A1  12/2014 Raskar et al.

OTHER PUBLICATIONS

Buttgen et al., Pseudonoise Optical Modulation for Real-Time 3-D Imaging with Minimum Interference, Oct. 2007, IEEE Transactions on Circuits and Systems—1: Regular Papers, vol. 54, No. 10, pp. 2109-2119.*

(Continued)

*Primary Examiner* — Toan Le
(74) *Attorney, Agent, or Firm* — Stephen R. Otis

(57) ABSTRACT

In illustrative implementations, a time-of-flight camera robustly measures scene depths, despite multipath interference. The camera emits amplitude modulated light. An FPGA sends at least two electrical signals, the first being to control modulation of radiant power of a light source and the second being a reference signal to control modulation of pixel gain in a light sensor. These signals are identical, except for time delays. These signals comprise binary codes that are m-sequences or other broadband codes. The correlation waveform is not sinusoidal. During measurements, only one fundamental modulation frequency is used. One or more computer processors solve a linear system by deconvolution, in order to recover an environmental function. Sparse deconvolution is used if the scene has only a few objects at a finite depth. Another algorithm, such as Wiener deconvolution, is used is the scene has global illumination or a scattering media.

18 Claims, 12 Drawing Sheets

(56) References Cited

OTHER PUBLICATIONS

Buttgen, B., et al., 2005, CCD/CMOS Lock-in pixel for range imaging: challenges, limitations and state-of-the-art. In Proceedings of 1st Range Imaging Research Day.
Flaig, G., 2012, Why We Should Use High Values for the Smoothing Parameter of the Hodrick-Prescott Filter. CESifo Working Paper No. 3816, May 2012.
Foix, S., et al., 2011, Lock-in Time-of-Flight (ToF) Cameras: A Survey. IEEE Sensors Journal, vol. 11, No. 3, Mar. 2011.
Godbaz, J., et al., 2012, Closed-form inverses for the mixed pixel/multipath interference problem in AMCW lidar. Proc. SPIE 8296, Computational Imaging X, 829618 (Feb. 2012).
Heide, F., et al., 2013, Low-budget transient imaging using photonic mixer devices. ACM Transactions on Graphics (TOG)—SIGGRAPH 2013 Conference Proceedings TOG, vol. 32, Issue 4, Jul. 2013, Article No. 45, ACM New York, NY, USA.
Niclass, C., et al. 2009, Single-Photon Synchronous Detection. IEEE Journal of Solid-State Circuits, vol. 44, Issue 7, pp. 1977-1989, IEEE, Jul. 2009.
Payne, A., et al., 2009, Multiple Frequency Range Imaging to Remove Measurement Ambiguity. Proceedings of 9th Conference on Optical 3-D Measurement Techniques, 2009.
Payne, A., et al., 2010, Illumination waveform optimization for time-of-flight range imaging cameras. Proc. SPIE 8085, Videometrics, Range Imaging, and Applications XI, 80850D (Jun. 21, 2011).
Raskar, R., et al., 2012, 5d time-light transport matrix: What can we reason about scene properties? DSpace@MIT, Jan. 2012.
Raskar, R., et al., 2006, Coded exposure photography: motion deblurring using fluttered shutter. ACM Transactions on Graphics (TOG)—Proceedings of ACM SIGGRAPH 2006 TOG, vol. 25, Issue 3, Jul. 2006, pp. 795-804, ACM New York, NY, USA.
Spirig, T., et al., 1995, The lock-in CCD—two-dimensional synchronous detection of light. IEEE Journal of Quantum Electronics, vol. 31, Issue 9, pp. 1705-1708, IEEE, 1995.
Stoppa, D., et al., 2007, A CMOS 3-D Imager Based on Single Photon Avalanche Diode. IEEE Transactions on Circuits and Systems I: Regular Papers, vol. 54, Issue 1, pp. 4-12, IEEE, 2007.
Velten, A., et al., 2012, Recovering three-dimensional shape around a corner using ultrafast time-of-flight imaging. Nature Communications 3, Article No. 745, Mar. 2012.
Velten, A., et al., 2013, Femto-photography: capturing and visualizing the propagation of light. ACM Transactions on Graphics (TOG)—SIGGRAPH 2013 Conference Proceedings TOG, vol. 32, Issue 4, Jul. 2013, Article No. 44, ACM New York, NY, USA.

* cited by examiner

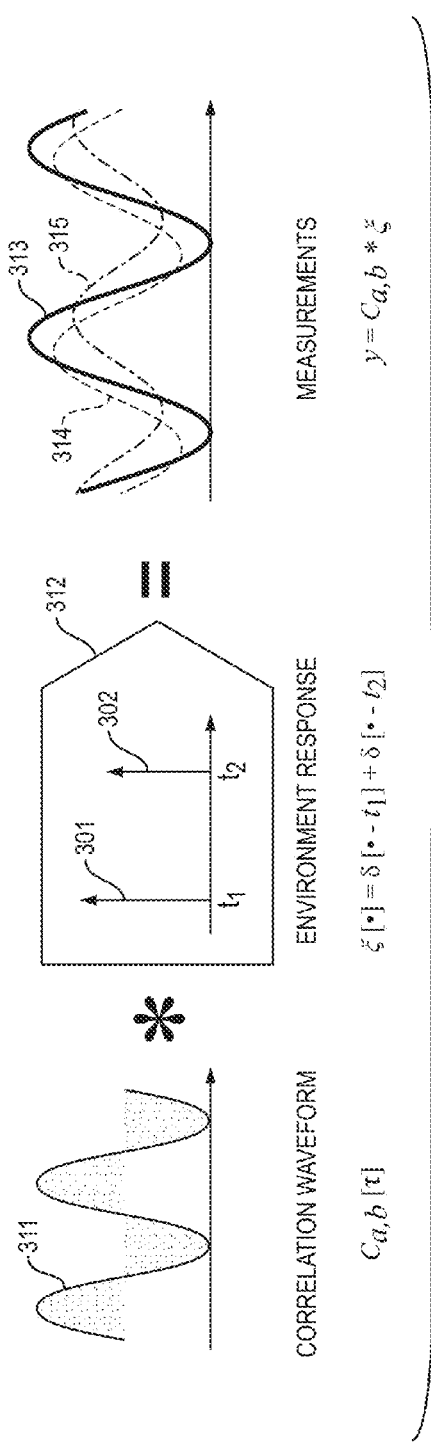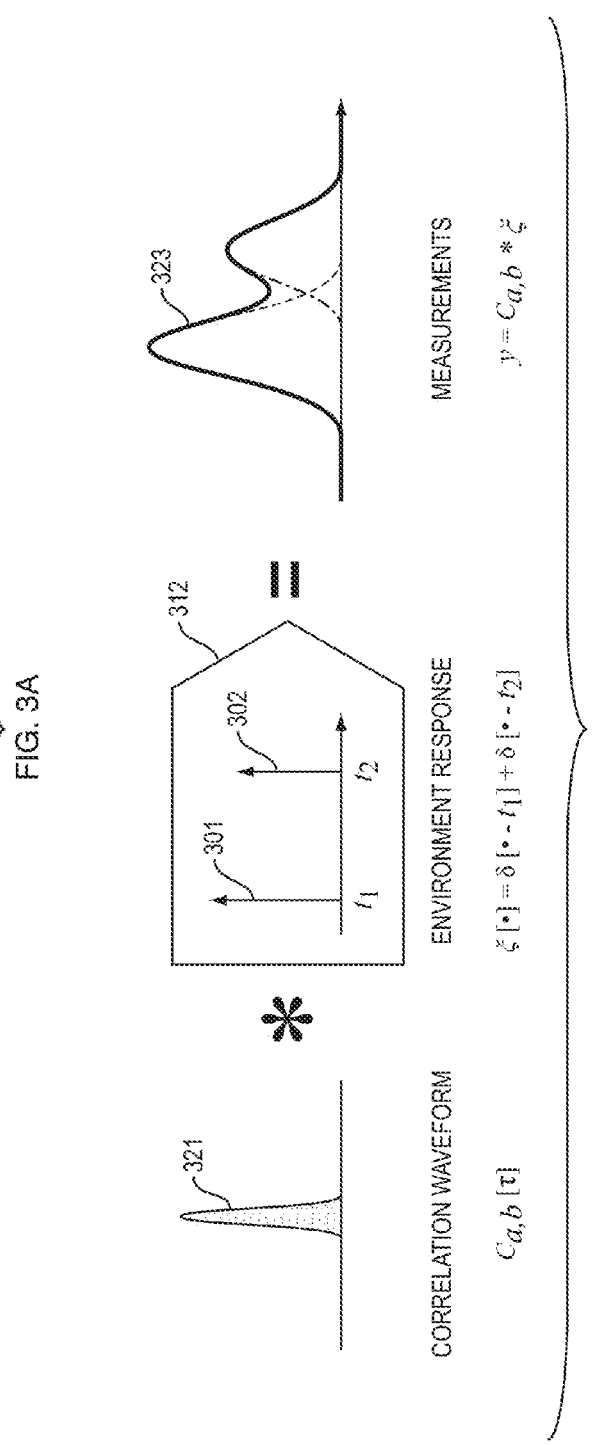
FIG. 3A
FIG. 3B

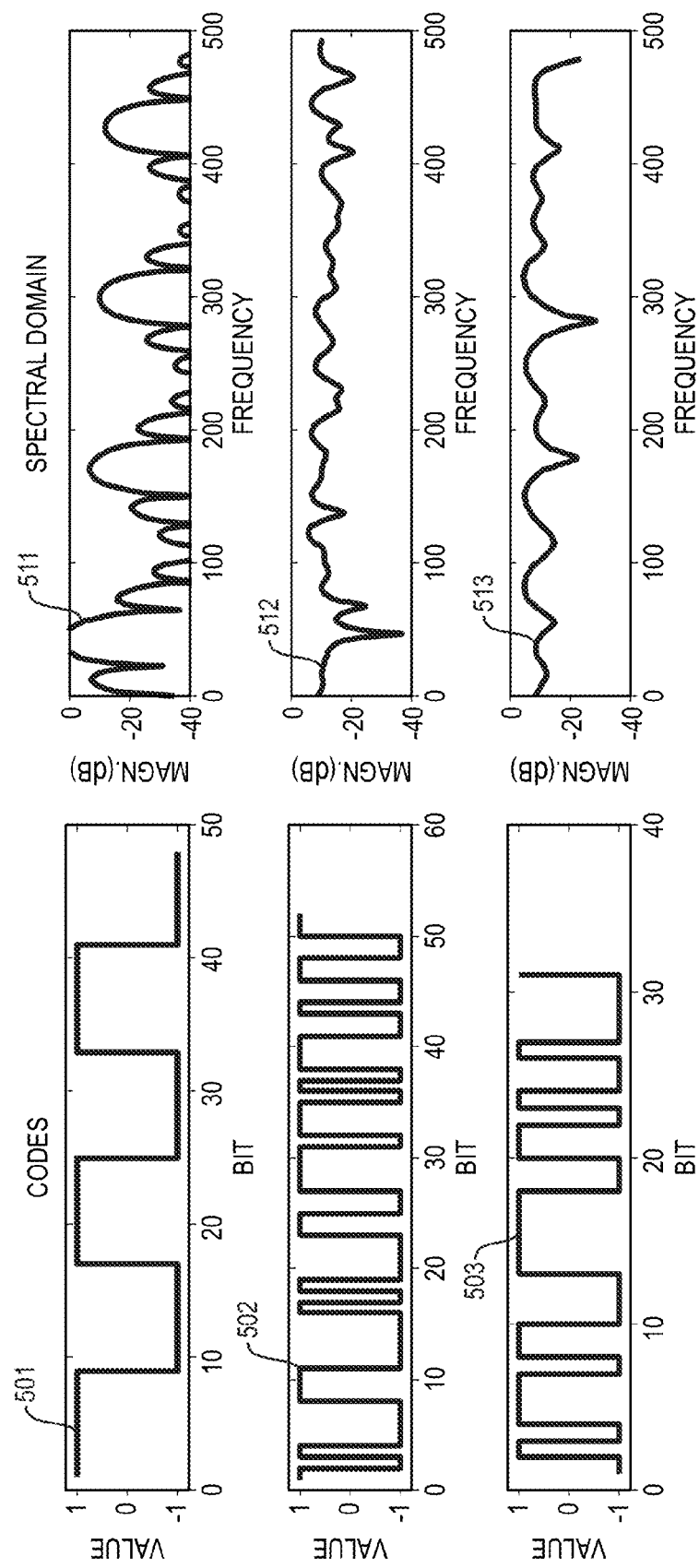

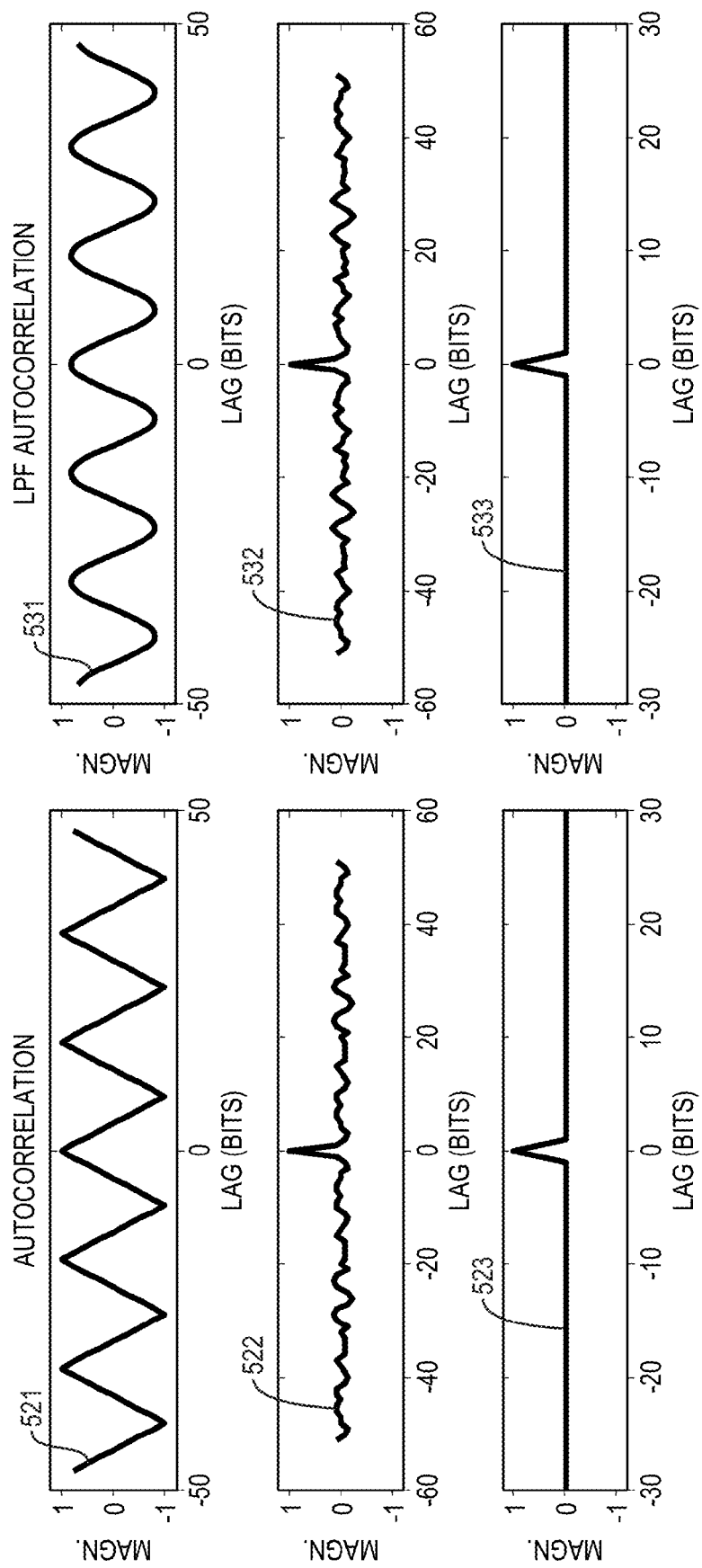

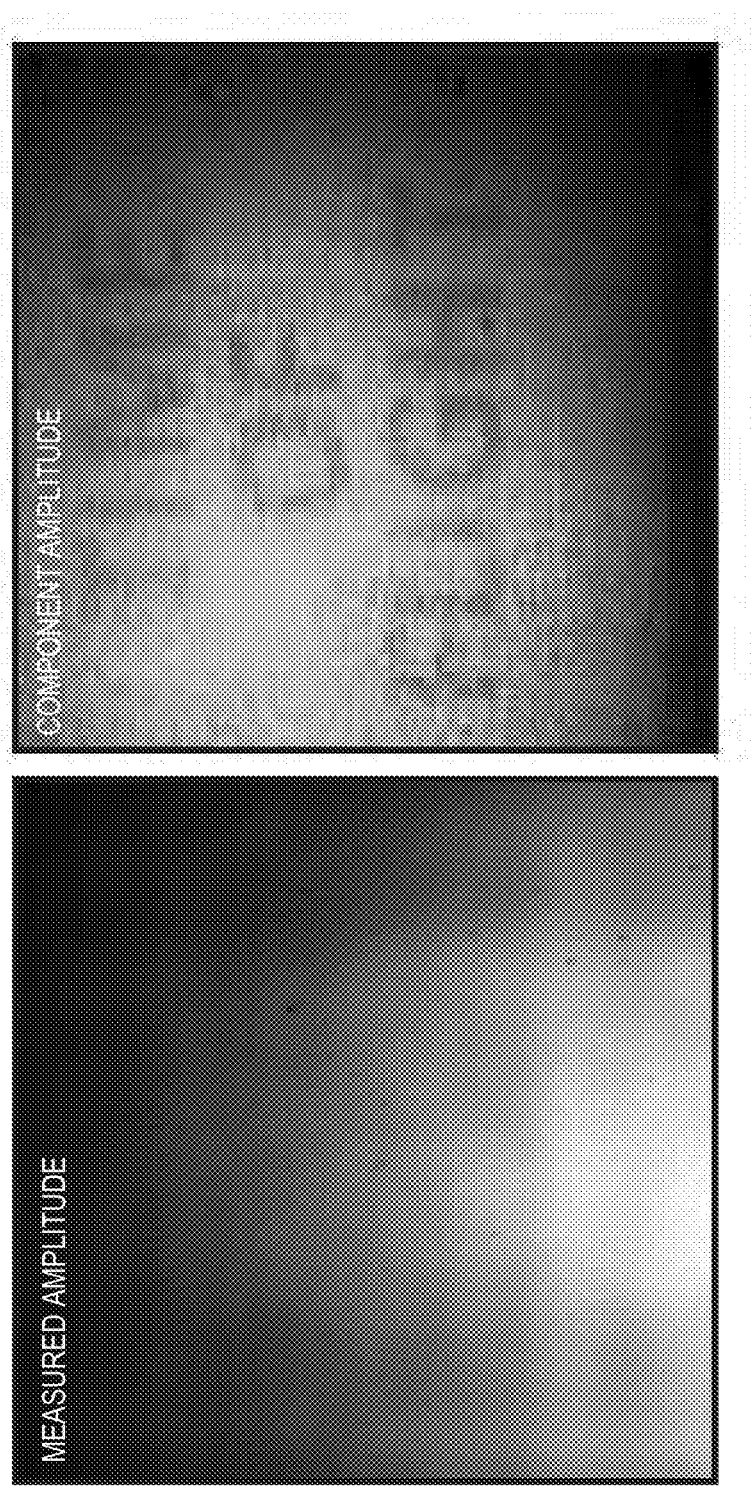

METHODS AND APPARATUS FOR CODED TIME-OF-FLIGHT CAMERA

RELATED APPLICATIONS

This application is a non-provisional of, and claims the benefit of the filing date of, U.S. Provisional Patent Application No. 61/895,132, filed Oct. 24, 2013, the entire disclosure of which is herein incorporated by reference.

FIELD OF THE TECHNOLOGY

The present invention relates generally to time-of-flight cameras.

BACKGROUND

In a conventional time-of-flight (ToF) camera, scene depth is measured based on the difference between the phase of light emitted by the camera and the phase of light reflected from the scene. However, conventional ToF cameras do not accurately measure scene depth in the case of mixed pixels—that is, pixels that receive light from multiple depths of the scene. The mixed pixel problem is sometimes called multipath interference.

SUMMARY OF INVENTION

In illustrative embodiments of this invention, the mixed pixel problem is solved: a ToF camera accurately measures scene depth, even at mixed pixels, while using only one fundamental modulation frequency.

In illustrative implementations, a time-of-flight camera robustly measures scene depths, despite multipath interference. The camera emits amplitude modulated light. An FPGA (field-programmable gate array) sends at least two electrical signals, the first to control modulation of radiant power of a light source and the second being a reference signal to control modulation of pixel gain in a light sensor. These signals are identical, except for time delays. These signals comprise binary codes that are m-sequences or other broadband codes. The correlation waveform is not sinusoidal. During measurements, only one fundamental modulation frequency is used. One or more computer processors solve a linear system by deconvolution, in order to recover an environmental function. Sparse deconvolution is used if the scene has only a few objects at a finite depth. Another algorithm, such as Wiener deconvolution, is used is the scene has global illumination or a scattering media.

In illustrative embodiments, this invention has numerous practical applications, including: (a) accurately measuring depth, even in the presence of multipath interference; (b) accurately measuring both foreground and background depths, in a scene in which a nearly transparent object in the foreground blocks a direct view of the background; (c) accurately measuring depth of the background of a scene, even when a direct view of the background is blocked by a diffuser; and (d) capturing light sweep images.

In illustrative embodiments, a light source in a ToF camera emits light that is amplitude modulated (e.g., by rapid strobing on and off).

A field-programmable gate array (FPGA) generates a first electrical control signal to drive the amplitude modulation of the emitted light, and a second electrical control signal that is a reference signal. The reference signal modulates gain at each pixel in a ToF sensor in the ToF camera.

In some implementations, both of these signals are periodic and each period of these signals comprises an m-sequence. As is well-known, m-sequences (also known as maximum length sequences) are a type of pseudorandom binary sequence (PN). PN sequences are deterministic, yet have a flat spectrum characteristic of random codes.

Using an m-sequence has at least four advantages, in the context of a ToF camera:

First, the m-sequence tends to minimize the condition number of the smearing matrix (discussed below), thereby making the smearing matrix easily invertible. The condition number of the smearing matrix is the ratio of the largest to the smallest eigenvalues of the smearing matrix and is indicative of the sensitivity of the solution to noise.

Second, as the period of an m-sequence increases, the autocorrelation of an m-sequence approaches an impulse function, which has an ideal broadband spectral response.

Third, if an m-sequence is used both as a reference signal for the light sensor pixels and to drive the amplitude modulation of the light source, then the correlation waveform of the ToF camera (which is the correlation of the reference signal and the received light) shows a distinct peak which is non-bandlimited.

Fourth, the length of the m-sequence is easy to adjust. If the m-sequence is too short, then the autocorrelation tends to be high even outside a central peak. If the m-sequence is too long, then acquisition time of measurements tends to be too long.

In a prototype of this invention, the following m-sequence is used: 0101110110001111100110100100001. This specific m-sequence has length 31 (m=5). However, other m-sequences may be used. For example, m-sequences with different lengths can be used. For example, in some implementations, an m-sequence with a length 15, 31, 63 or more is used.

An m-sequence is an example of a code that is broadband in the Fourier frequency domain (a "broadband code").

Alternately, any other broadband code may be used. Thus, in some implementations of this invention, the first and second electrical control signals (for driving amplitude modulation of the emitted light and gain modulation in lock-in pixels) are broadband in the Fourier frequency domain.

In illustrative embodiments of this invention, the smearing matrix of the ToF camera is Toeplitz, and thus its eigenvalues correspond to spectral amplitudes. Since the condition number of the smearing matrix is the ratio of the maximal and minimal eigenvalues, a low condition number in this context corresponds to a broadband spectrum.

Thus, in illustrative embodiments of this invention, a broadband code has the following advantages: it reduces the condition number of the smearing matrix of the ToF camera, and makes the smearing matrix well-conditioned and easily invertible.

In a prototype of this invention, a Raskar broadband code is used. A "Raskar broadband code" means the following sequence: 1010000111000001010000110011110111010111001001100111. However, other broadband codes may be used.

For example, in some embodiments of this invention, the electrical signals that drive illumination and reference each comprise a flat spectrum signal, as that term is defined herein. A flat spectrum signal is an example of a broadband signal.

In illustrative implementations of this invention, the electrical control signals (which drive modulation of the light source and of gain in the ToF sensor) have only one fundamental frequency throughout the time interval in which the ToF sensor takes measurements. This is different than some existing ToF sensors which use a sequence of different fundamental modulation frequencies in order to measure depth in a scene.

In conventional ToF cameras: (a) the electrical control signals (which drive modulation of the light source and of gain in the ToF sensor) are square waves (or substantially square waves); and (b) the correlation waveform is sinusoidal (or substantially sinusoidal). In contrast, in illustrative implementations of this invention, these electrical signals comprise m-sequences or other broadband codes, and the correlation waveform is not substantially sinusoidal.

In illustrative implementations of this invention, these electrical control signals comprise binary codes, such as m-sequences or other broadband codes.

According to principles of this invention: Measurements taken at a pixel in the ToF sensor over time are mathematically represented as a measurement vector y. This measurement vector y is modeled as a convolution of an unknown environmental (scene) response $\xi[t]$ and a deterministic kernel $\zeta[t]=(r \otimes i)[t]$ and a low pass filter $\phi$, where $\otimes$ denotes the cross-correlation operator. The low-pass filter represents a smoothing due to the rise/fall time of the electronics. In matrix form, the measurement vector is expressed as a linear system: y=Hx. The smearing matrix $H^{d \times d}$ is a Toeplitz matrix determined by the particular binary codes that are used, $y^{d \times 1}$ is the measured cross-correlation at a mixed pixel, and $x^{d \times 1}$ is the recovered environment vector to create the output. Specifically, the vector $x \in \mathbb{R}^d$ is the vector corresponding to the environment $\xi[t]$, that is $x=[\xi[0], \xi[1], \ldots, \xi[d-1]]^T$.

In illustrative embodiments, in order to solve this linear system (i.e., in order to recover the environmental response x from the measurement vector y), the smearing matrix H is invertible. The binary codes are selected so that the smearing matrix H has a low condition number and is invertible.

In illustrative implementations of this invention, computer processors perform an algorithm to recover the unknown environmental vector x from the measurement vector y. If the scene consists of only a few objects at finite depths and there is no scattering media, then the environmental vector x can be expressed a sparse time profile consisting of a train of Dirac impulses. In this sparse case, the processors perform sparse deconvolution to recover the environmental response (e.g., the Dirac spikes). A variety of well-known algorithms may be employed for the sparse deconvolution. For example, in some embodiments of this invention, one or more computer processors perform a sparse deconvolution algorithm, which algorithm is either a LASSO, OMP (orthogonal matching pursuit), Basis Pursuit Denoising, or CoSaMP algorithm.

If, however, the scene contains many objects or scattering media (such as a diffuser), then the environmental vector x will not be sparse. In this non-sparse case, the processors do not use sparse deconvolution. A variety of well-known algorithms may be used to solve the linear system in the non-sparse case. For example, in some cases, processors perform Wiener deconvolution to recover the environmental response. For example, in some cases the processors perform Hodrick-Prescott filtering to approximate an ideal Wiener deconvolution.

The deconvolution (e.g., sparse or Wiener) recovers the environmental vector x.

The elements of the environmental response vector x for a pixel are equal to the received light intensity at that pixel over time. For example, the eighth element of the environmental response vector x for a pixel is equal to the light intensity measured at the pixel at the eighth time.

The environmental response vector x encodes phase, in the sense that: (A) the time of arrival is indicated by position of an element in the vector (e.g., eighth element in the vector is intensity at the eighth time), (B) and the phase shift (or time shift) is directly indicated by the time of arrival. Because the environmental response X is a time profile vector that encodes phase as a function of time, the environmental response is sometimes called a phase profile function.

The environmental response vector x encodes distance, in the sense that distance can be determined (a) from the time delay by the equation d=c*zeta/2, where zeta is the time delay, or (b) directly from a look-up table created during calibration.

In illustrative implementations, the correlation waveform (of the correlation of the reference signal and the received light) has a single peak in each period. (See FIG. 3B). The position of this single peak encodes: (a) the time delay (i.e., the delay from when the light leaves the ToF camera until when the light returns to the ToF camera), (b) the phase shift, and (c) the scene depth.

In illustrative implementations, the ToF camera is calibrated by determining which scene depth corresponds to which position of the single peak of the correlation waveform. This data is stored in a look-up table. Then, during operation of the ToF camera, once a computer determines the position of the single peak of the correlation waveform, the computer retrieves the corresponding scene depth from the look-up table.

In some cases, a computer uses all of the frequencies of the correlation waveform to determine scene depths and light intensities. In other cases, a computer uses only the fundamental frequency of the correlation waveform to determine scene depths and light intensities. The latter approach (using only the fundamental frequency) is more robust to noise, in some cases.

In illustrative implementations: (a) the ToF camera detects an unambiguous depth over a range of depths that correspond to one period of the correlation waveform; and (b) if the scene contains depths that are outside of this range, then the depth measurements are ambiguous, because the correlation waveform repeats periodically.

In illustrative implementations, one or more computers calculate a light sweep image. A "light sweep image" means a set of data that: (a) is calculated from measurements, taken by a ToF sensor, of light reflected from a scene; and (b) specifies, for one or more pixels in the ToF sensor, light intensity at multiple depths in the scene.

In illustrative implementations, a light sweep image specifies a grayscale light intensity for each voxel in a scene. Each pixel in the ToF sensor measures light intensity for a column of voxels in the scene, which column is one voxel wide (that is, a 2D position of the pixel corresponds to a 2D position of the column).

The data in a light sweep image is not necessarily captured in a single exposure. In illustrative implementations, the data in a "light sweep image" is captured by repeated sampling of a correlation waveform at different time points of the correlation waveform. (For these purposes, the correlation waveform is the correlation of the reference signal and the received light.) For example, if a scene is spatially static and the modulation is periodic, then in some cases the correlation waveform is sampled one time in each period, at different time points in the period. If a scene is spatially static and the modulation is aperiodic, then in some cases the correlation waveform is sampled repeatedly during a single exposure (the exposure time being equal to the total time of the modulation code).

In some implementations, all or part of the data in a light sweep image is displayed in a digital image that is visually perceptible to a human being. For example, in the diffuser example, to show the back wall, only intensities at the depth of the back wall are displayed in the digital image. Or, for example, in the glass vase example, each pixel in the digital image shows the sum of all intensities in the z (depth) direction for that pixel. In some cases, the digital images are displayed in temporal sequence as a movie.

FIG. 1B is an example of frames from a light sweep image. In FIG. 1B, the light sweep image appears to show a transient response of a scene to a single, very short pulse of light. The scene is static, in that the spatial position of objects in the scene do not change. However, the illumination of the scene changes over time, as illumination sweeps over the scene and then fades.

Although the light sweep image in FIG. 1B appears to show a transient response of a scene to a single, very short pulse of light, it was actually recorded by taking samples of the correlation waveform during many different periods of the correlation waveform. One sample was taken during each such period, but the samples were taken at different times in the period. For example, the $k^{th}$ sample was taken at time $$t + \frac{kp}{n},$$

where t is the start of the $k^{th}$ period, p is the period of the correlation waveform, and n is the number of samples at each pixel.) This works because, for a spatially static scene, the transient response to identical light pulses is the same.

It is desirable to oversample the measurements, in order to make the measurements more robust (e.g., to noise). Thus, it is desirable for n (the number of samples at each pixel) to be large. For example, in some cases, 2000 samples are taken to record a light sweep image. In this context, each "sample" is a single demodulation of an impinging optical signal by the pixel. For example, if the ToF light sensor comprises so-called "four bucket" lock-in pixels, then, in some cases, a single sample at a pixel includes taking four sub-samples at different phases of the reference signal and storing the four collected charges in four different so-called buckets.

In many light sweep images, a scene contains scattering media or has global illumination due to many different objects in the scene. In that case, the environmental response is not sparse, so: (a) sparse deconvolution is not used; and (b) another algorithm, such as Wiener deconvolution, is used to recover the time profile.

In some applications of this invention, a ToF camera sees through a diffuser. Consider a scene in which a diffuser, in the foreground, blocks a direct view of a wall, in the background. The wall has words printed on it. In this scene, light that reflects from the wall passes through the diffuser before reaching the ToF camera. Neither the wall nor the writing on the wall can be seen through the diffuser by ordinary means (such as an ordinary camera or the unaided human eye). However, in an illustrative application of this invention, a ToF camera (a) accurately measures the depth of the wall in the background of this scene, and (b) captures a clear visual image of the wall, including the words written on the wall. The environmental response of this scene is not sparse, due to the presence of the scattering media (the diffuser). Thus, the environmental response is recovered by Weiner deconvolution and then scene depth is computed from the environmental response, as discussed above. Even though the diffuser was spatially interposed between the ToF camera and the back wall, a computer calculates a clear visual image of the wall by selecting, from the light sweep image, only the light intensities at the depth of the wall, and displaying only those selected intensities.

Thus, in some implementations of this invention, only light intensities for voxels at a specific depth of the scene are displayed. For example, in some cases: (a) a computer calculates a light sweep image; (b) the computer uses the light sweep image to calculate control signals for displaying a digital image on a screen; (c) the digital image includes light intensities for voxels at a specific depth of the scene, but not at other depths in the scene; and (d) one or more of the voxels correspond to a scene position that is viewable to the camera only through a diffuser.

In illustrative embodiments, each pixel in the light sensor is an analog sensor, such as an analog lock-in pixel or an analog Photonic Mixing Device. Measurements from these analog sensors are converted to digital format by an ADC (analog-to-digital converter). However, this invention is not limited to analog light sensors. In some cases, a digital light sensor is used. For example, in some embodiments of this invention, phase and intensity of light are detected simultaneously using a digital technique called single-photon synchronous detection (SPSD). SPSD involves measurements with single-photon avalanche diodes (SPADs).

In illustrative embodiments, homodyne detection is employed. That is, the electrical control signals for illumination and reference are identical, except for time delays. However, this invention is not limited to homodyne detection. For example, in some embodiments, heterodyne detection is employed—that is, the electrical control signals for the illumination and reference differ in frequency. Heterodyne detection may impose a greater computational burden than homodyne detection In illustrative embodiments, the electrical control signals for illumination and reference are periodic. If the electrical control signals are periodic, then each period of the signal comprises the code (e.g., each period is an m-sequence, or each period is a broadband code, or each period is a flat spectrum code). However, this invention is not limited to periodic control signals. For example, in some cases, these electrical signals are not periodic, and the exposure time is equal to the time it takes to run the code once.

In illustrative embodiments, the illumination modulation and reference signal are binary. For example, in some cases, a light source is strobed on and off. However, this invention is not limited to binary modulation. Modulation may modulate among or between any number of states, where the number is greater than or equal to two. For example, in some implementations of the invention, ternary modulation is used. In ternary modulation, the light source has three radiance settings (disregarding transitions between states) and the modulation of gain of the light sensor pixels has three levels (again, disregarding transitions between states). (Of course, even for ternary modulation of illumination and gain, the electrical control signals that drive the modulation can themselves be digital and binary, as long as the binary data encodes the ternary modulation).

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

BRIEF DESCRIPTION OF THE DRAWINGS

FIG. 3A is a conceptual diagram of a conventional ToF camera, in which a sinusoidal correlation waveform is used.

FIG. 3B is a conceptual diagram of an example of this invention, in which a non-sinusoidal correlation waveform is used.

FIG. 5A shows three different codes: (1) a conventional square code; (2) a broadband code; and (3) an m-sequence.

FIGS. 5B, 5C, and 5D show (a) frequency domain spectrum, (b) autocorrelation and (c) low-pass filter (LPF) autocorrelation for the three different codes shown in FIG. 5A.

FIGS. 10A and 10B are images of a scene captured through a diffuser. FIG. 10A is a conventional photograph, in which the image is blurred by the diffuser. FIG. 10B is a much clearer image captured in an illustrative implementation of this invention.

The above Figures show some illustrative implementations of this invention, or provide information that relates to those implementations. However, this invention may be implemented in many other ways.

DETAILED DESCRIPTION

Conventional time-of-flight ("ToF") systems achieve depth ranging by amplitude modulation of a continuous wave. These conventional ToF systems assume a single optical path length (range or depth) value per pixel the scene, although the scene may actually consist of multiple depths, e.g., a transparency in front of a wall. If there are multiple depths in a scene, then there are multiple path lengths (from the light source, to the scene, and back to the ToF camera), and a single pixel may receive light reflected from multiple depths in the scene. This scenario (which occurs when multiple light-paths hit the ToF sensor at the same pixel) is commonly known as a "mixed pixel" or "multipath interference". A conventional ToF camera cannot accurately determine the depth of a mixed pixel; instead, a conventional ToF camera measures a range that is a non-linear mixture of the incoming light paths In illustrative implementations, this invention solves or mitigates the mixed pixel problem in many scenarios, as follows: The sequence of optical path lengths involved in light reaching each pixel is recovered and expressed as a time profile. A light source emits a binary code of strobed illumination, in order to illuminate the scene. Light reflects back from the scene to the ToF camera. A light sensor in the ToF camera records a sequence of demodulated values using successive electronic delays. In some cases (e.g. if the environmental response is sparse), a computer uses a sparse deconvolution algorithm to recover a sequences of Diracs in the time profile corresponding to the sequence of path lengths to multipath combinations. Alternately, if the environmental function is not sparse, then another algorithm (such as Wiener deconvolution) is used to solve for the time profile.

Figure 1A:
FIG. 1A shows a first scene with a glass vase.
Figure 1B:
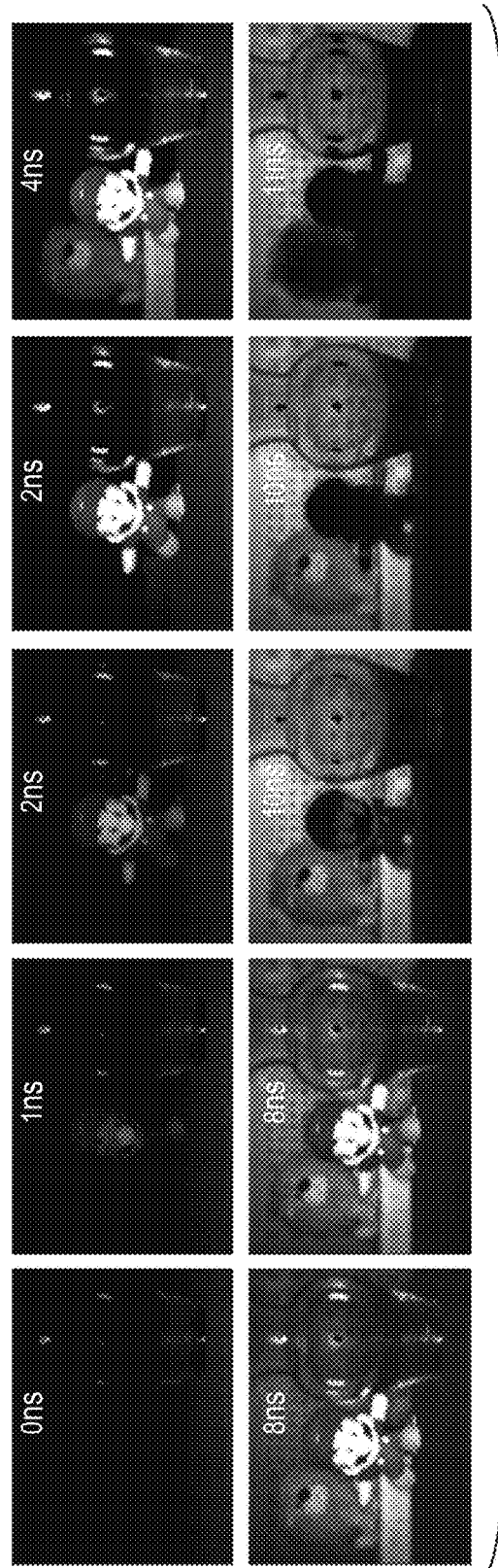
FIG. 1B comprises frames of a movie of light sweeping over the first scene.

FIG. 1A shows a scene with a glass vase in foreground and stuffed animals and a wall in the background. FIG. 1B comprises frames of a movie of light sweeping over the scene. The scene is spatially static. Each frame of the movie is a digital image calculated from a light sweep image. In this movie, multipath effects can be seen in the glass vase. In the early time-slots (e.g. 0 ns and 1 ns), bright spots are formed from the specularities on the glass. Light then sweeps over the other objects on the scene and finally hits the back wall, where it can also be seen through the glass vase (8 ns). Light leaves, first from the specularities (8-10 ns), then from the stuffed animals. The time slots correspond to the true geometry of the scene (light travels approximately 1 foot per nanosecond, times are for round-trip). In the example shown in FIG. 1B, this invention solves for multipath effects, e.g., the interactions of the translucent vase and back wall.

Figure 2:
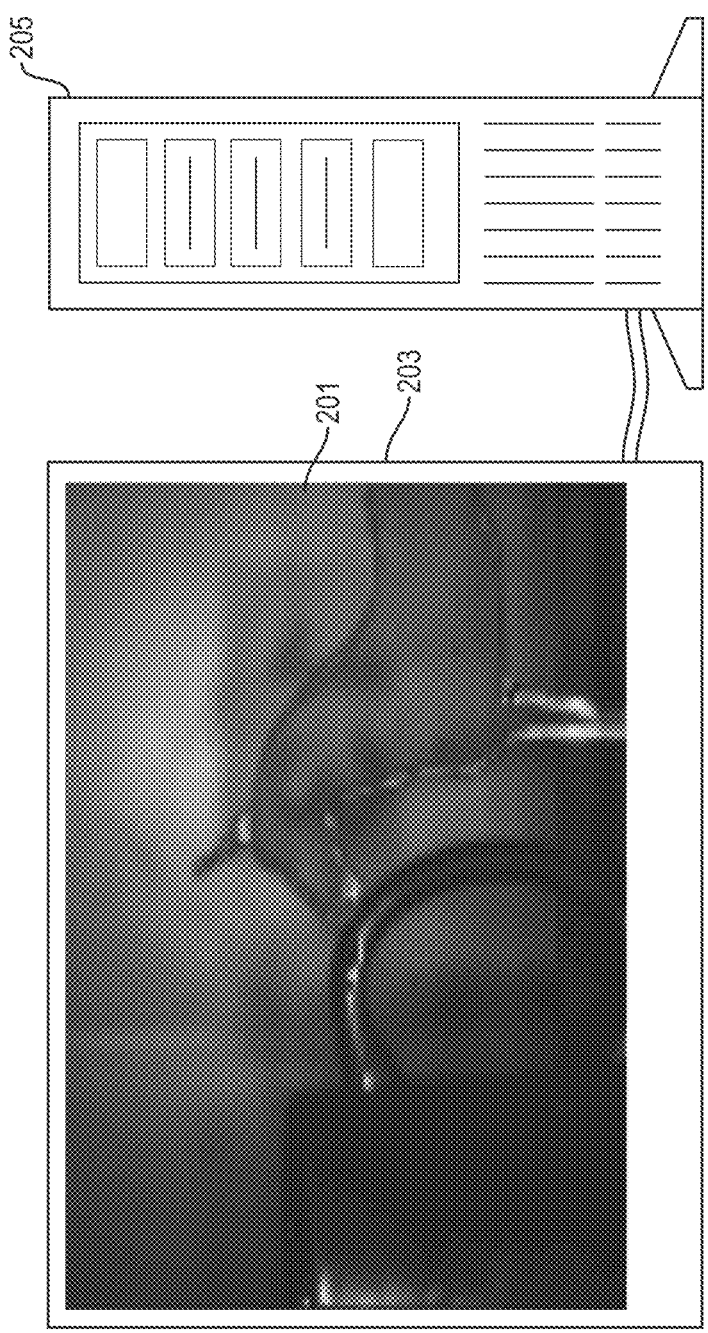
FIG. 2 shows a screen displaying a digital image of a second scene (with a unicorn in the scene).

FIG. 2 shows a screen 201 of a monitor 203 displaying a digital image of a scene. The scene has an almost transparent, acrylic unicorn in the foreground, and a wall in the background. A conventional ToF camera cannot recover depth of a transparent object, such as the acrylic unicorn. However, in illustrative implementations of this invention, a multipath algorithm accurately calculates the depth of the foreground (acrylic unicorn) and the background (wall). In the example shown in FIG. 2, a computer 205 outputs control signals to control the display of the digital image on the screen 201.

Throughout this discussion, f(•) is used for functions with continuous argument and f[•] is used for functions with discrete argument.

As used herein, cross-relation is defined as follows: Given two functions a(t) and b(t), the cross-correlation is $$c_{a,b}(\tau) = \lim_{\Delta\to\infty} \frac{1}{2\Delta} \int_{-\Delta}^{+\Delta} a^*(t)b(t+\tau)dt \Leftrightarrow (a \otimes b)(t) \forall\, t \in \mathbb{R}$$

where a* denotes complex-conjugate of a, $\otimes$ denotes the cross-correlation operator, and τ is the time shift between the two functions.

Cross-correlation is related to the convolution operator by:

$$(a \otimes b)(t) = (\overline{a}^* * b)(t)$$

where $\overline{a}(t)=a(-t)$, and where * denotes the linear convolution operator.

The definition of cross-correlation leads to a natural extension for discrete sequences:

$$c_{a,b}[\tau] = \frac{1}{K}\sum_{k=0}^{K-1} a^*[k]b[\tau+k] \Leftrightarrow (a \otimes b)[\tau]$$

where a[k]=a(kT) and b[k]=b(kT), $\forall k \in \mathbb{Z}$ and for some sampling step T>0.

A ToF camera uses an illumination control waveform $i_\omega(t)$ with a modulation frequency ω to strobe the light source. In practice, in ToF cameras, the illumination waveform is often a periodic function such that:

$$i_\omega(t+T_0) = i_\omega(t)$$

where $T_0$ is the time-period of repetition.

Since a homodyne setting is employed, for the sake of notational simplicity, the subscript ω is not used. Instead, $i=i_\omega$ is used. The TOF camera measurements are obtained by computing $c_{m,r}(\tau)$ where m(t) is the optical signal from the light source, and r(t) is the reference signal.

In many embodiments (both of this invention and of conventional ToF cameras), the illumination control signal and reference signal are the same, that is, i(t)=r(t). The phase, which is encoded in the shift $\tau^*$=arg max$_\tau c_{m,r}[\tau]$, can be obtained a number of ways.

In some conventional ToF cameras, only 2 to 4 samples of the correlation function $c_{m,r}[\tau]$ are used for the computation of the phase. For many modulation functions, a sample on the rising edge and another on the falling edge are sufficient to find the peak. Another technique for computing the phase involves oversampling of the correlation function. The oversampling case is germane to the problem of multipath as the correlation function (for a binary code) can become distorted. In a conventional ToF camera, the final calculation from phase to distance is a straightforward linear calculation. For a Photonic Mixer Device ("PMD") that uses square wave modulation and a sinusoidal form for $c_{m,r}[\tau]$, the conversion is simply:

$$d = \frac{c\phi}{4\pi f_\omega}, c = 3 \times 10^8 \ m/s$$

Time-of-flight cameras can theoretically operate at different modulation frequencies, which means that the distance is constant at different modulation frequencies and thus the ratio $\phi/f_\omega$ is constant, that is, doubling the modulation frequency will double the phase for a single-path scene.

Conventional ToF cameras use a sinusoidal correlation function. This approach works for conventional range imaging, but cannot deal with multipath objects.

FIG. 3A is a conceptual diagram of a conventional ToF camera, in which a sinusoidal correlation waveform is used. FIG. 3B is a conceptual diagram of an example of this invention, in which a non-sinusoidal correlation waveform is used. The former (the conventional ToF camera) cannot accurately measure scene depth in the presence of multipath interference, but the latter (the example of this invention shown in FIG. 3B) can.

In FIGS. 3A and 3B, a scene has two objects at different depths, so that the environmental response 312 comprises light reflecting from the scene in two reflected pulses 301, 302, at times $t_1$ and $t_2$, respectively. Also, in FIGS. 3A and 3B, correlation waveforms 311, 321 are each a plot of cross-correlation $c_{m,r}[\tau]$ (that is, the cross-correlation of the reference signal and the optical signal from the light source).

FIG. 3A illustrates operation of a conventional ToF camera. In a conventional ToF camera, a sinusoidal correlation waveform 311 and an environmental response 312 are convolved, resulting in an output measurement 313 that is also sinusoidal. In FIG. 3A, the two reflected sine waves 314, 315 from the two objects at different scene depths add to produce a sinusoidal measurement 313. The phase of this measured sinusoid 313 is in-between the phases of the component sinusoids 314, 315, which creates a problem of unicity. It is unclear whether two component sine waves 314, 315 are really in the environment, or if only one component 313 exists (with the mixed phase).

FIG. 3B shows a non-sinusoidal correlation waveform 321 that avoids problems with unicity. This can be done by selecting appropriate binary sequences for r(t) and i(t) (such as the broadband code and m-sequence codes illustrated in FIG. 5A). The code selection also ties in with the conditioning of the inverse problem, as discussed below.

In the example of this invention shown in FIG. 3B, the environmental response 312 is sparse and has two Dirac delta peaks 301, 302, corresponding to two different depths in a scene. A non-sinusoidal correlation waveform 321 and the environmental response 312 are convolved, resulting in output measurement 323. The non-sinusoidal correlation waveform 321 shows a distinct peak that is non-bandlimited. Therefore, when the non-sinusoidal correlation waveform 321 is convolved with the environmental response 312, the output measurement 323 has two distinct peaks. The Diracs in the environmental response are recovered by sparse deconvolution.

Figure 4C:
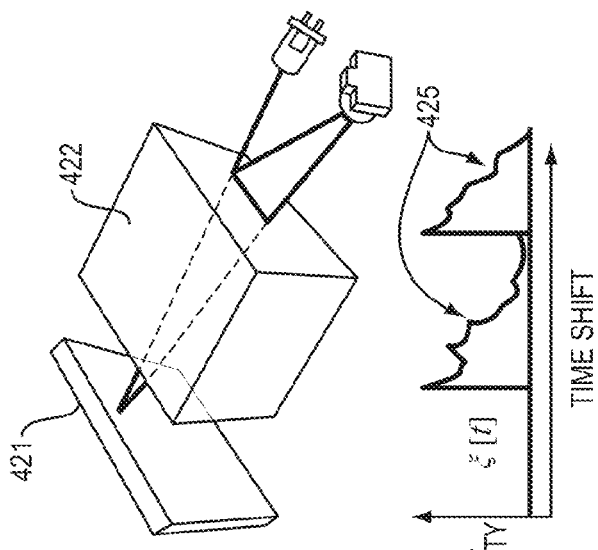
FIGS. 4A, 4B, and 4C show examples of an environmental profile function.
Figure 4B:
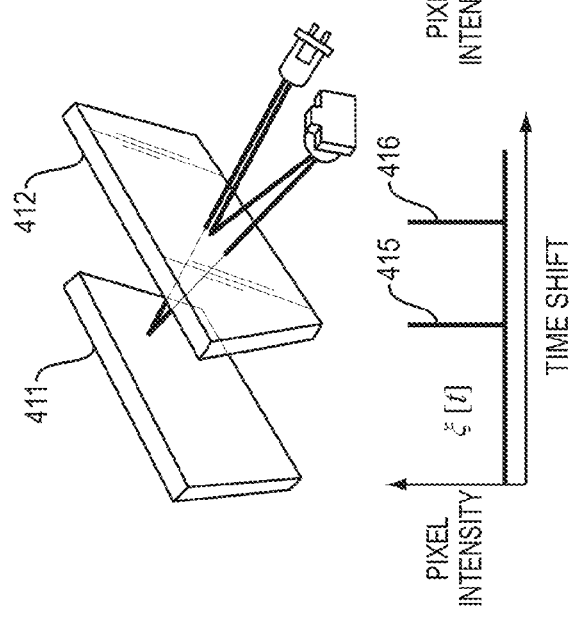
Figure 4A:
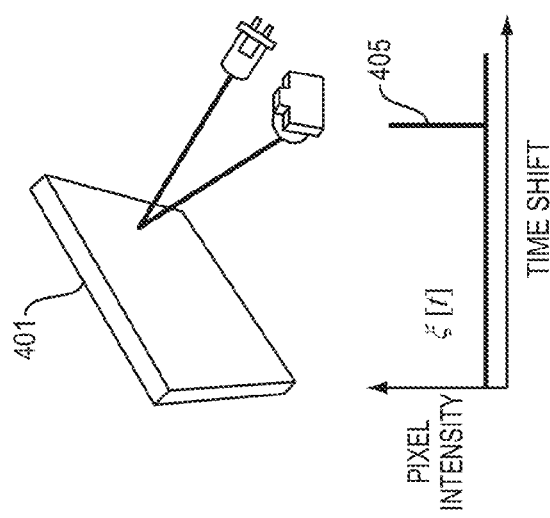

FIGS. 4A, 4B, and 4C show examples of an environmental profile function. In each of these Figures, the environment profile function ξ[t] is a discretized time profile. In FIG. 4A, the scene comprises one opaque wall 401, and the environment profile appears as a single spike 405. In FIG. 4B, the scene comprises a transparency 412 in front of an opaque wall 411, and the environment profile appears as a pair of spikes 415, 416. In FIG. 4C, the scene comprises scattering media 422 in front of an opaque wall 421, and the environmental response appears as a time profile 425 that is not sparse. For many applications of time-of-flight, a sparse formulation of ξ[t] is desired.

In some existing ToF cameras, an alternate approach is used: to acquire range maps at different modulation frequencies and then solve a fitting problem to resolve multipath. Unfortunately, the problem of exponential fitting is known to be ill-conditioned and the implementation is often challenging: it is time consuming, requires additional hardware for multi-frequency, and the frequency response calibration varies from shot to shot.

In contrast, in illustrative implementations of this invention, multipath recovery is performed using only a single fundamental frequency.

Forward Model of Environmental Convolution

In illustrative implementations of this invention, a forward model of environment convolution is employed. For this forward model: Start by relating the optically measured signal m[t] to the discrete illumination control signal i[t]:

$$m[t] = (i*\phi*\xi)[t] \quad (1)$$

Here, the illumination signal i[t] is first convolved with a low-pass filter φ[t]. This represents a smoothing due to the rise/fall time of the electronics. Subsequent convolution with an environment response ξ[t] returns the optical measurement m[t].

The function ξ[t] is a scene-dependent time profile function (FIG. 4). For a single opaque object, ξ[t] appears as a Kronecker Delta function: $\delta[t-\phi]$ where $\phi$ represents the sample shift that encodes path-length and object depth. In the multipath case, without scattering, the environment function represents a summation of discrete Dirac functions:

$$\xi[t] = \sum_{k=1}^{K-1} \alpha_k \delta[t - t_k],$$

where $\{\alpha_k, \tau_k\}_{k=0}^{K-1}$ denotes amplitude scaling and phases, respectively.

The measured cross-correlation function in the presence of the environment function is:

$$c_{r,i^* \varphi^* \xi}[\tau] = (r \otimes (i^* \varphi^* \xi))[\tau] \quad (2)$$

$$= \underbrace{((r \otimes i))^*}_{\zeta[t]} \varphi^* \underbrace{\sum_{k=0}^{K-1} \alpha_k \delta[\cdot - t_k]}_{\text{Sparse Environment Response}}$$

$$= \zeta^* \varphi^* \sum_{k=0}^{K-1} \alpha_k \delta[\cdot - t_k]$$

where $\zeta$ is the deterministic kernel.

In this forward model (including Equation 2), measurements $c_{r,i^* \phi^* \xi}[\tau]$ are the cross-correlations in presence of an unknown, parametric environment response, $\xi[t]$. The measurement is modeled as a convolution between the environment and the deterministic kernel, $\zeta[t]=(r \otimes i)[t]$ and the low pass filter, $\phi$.

To condition the problem, note that Equation 2 can be developed as:

$$\underbrace{(\zeta^* \varphi)^*}_{h} \xi[t] = (h^* \xi)[t] \quad (3)$$

where h[t] is the convolution kernel resulting from low-pass filtering of $\zeta$.

In vector-matrix form the convolution is a circulant Toeplitz matrix acting on a vector:

$$y = \underbrace{(h^* \xi)[t]}_{Hx} \Leftrightarrow \underbrace{H^{d \times d}}_{\text{Toeplitz}}: x^{d \times 1} \mapsto y^{d \times 1} = Hx \quad (4)$$

where $y \in \mathbb{R}^d$ is measurement vector which amounts to the sampled version of the correlation function where d represents the number of samples.

The convolution matrix $H \in \mathbb{R}^{d \times d}$ is a circulant Toeplitz matrix, where each column is a sample-shift of h[t]. Note that h implicitly contains a low-pass filter $\phi$. The vector $x \in \mathbb{R}^d$ is the vector corresponding to the environment $\xi[t]$, $$x = [\xi[0], \xi[1], \ldots, \xi[d-1]]^T.$$

To estimate parameters of $\xi$, given y, the inverse of the convolution matrix H should be well defined. Equation 4 is a linear system. Provided that H is well conditioned, H can be inverted in the context of linear inverse problems. Since H has a Toeplitz structure, it is diagonalized by the Fourier matrix and the eigenvalues correspond to the spectral components of h.

Controlling the condition number of H amounts to minimizing the ratio of highest to lowest Fourier coefficients of h[t] or eigenvalues of H. This is the premise for using binary sequences with a broadband frequency response. FIGS. 5A and 5B show several codes as well as their spectrums.

Sparse Formulation

Since $\xi[t]$ is completely characterized by $\{\alpha_k, \tau_k\}_{k=0}^{K-1}$, in the multipath case, it is desirable to estimate these parameters. For given set of measurements y $$y[\tau] = \sum_{k=0}^{K-1} \alpha_k h[\tau - t_k] \Leftrightarrow y = Hx$$

and knowledge of h, the problem of estimating $\xi$ boils down to $$\arg\min_{(\alpha_k, t_k)} \left| \sum_{k=0}^{K-1} y[t] - \sum_{k=0}^{K-1} \alpha_k h[t - t_k] \right|^2.$$

There are many classic techniques to solve this problem in time or in frequency domain, including a pseudoinverse or even Tikhonov regularization. However, since $\xi$ is a K-sparse signal, an advantageous approach is to begin with a sparsity promoting optimization scheme. The problem falls into the deconvolution framework mainly because of the low-pass nature of h or the smearing effect of H. In this context, the sparse deconvolution problem results in the following problem:

$$\arg\min_x \|Hx - y\|_2^2 \text{ such that } \|x\|_0 \leq K, \quad (5)$$

where $\|x\|_0$ is the number of non-zero entries in x.

Due to non-convexity of $\|x\|_0$ and mathematical technicalities, this problem is intractable in practice. However, a version of the same which incorporates convex relaxation can be cast as:

$$\arg\min_x \|Hx - y\|_2^2 \text{ such that } \|x\|_1 \leq K,$$

where $\|x\|_1 = \sum_k |x_k|$ is the $l_1$-norm.

This is commonly known as the LASSO problem. Several efficient solvers exist for this problem. In some implementations of this invention, SPGL1 and CVX are used to solve the LASSO problem. Alternately, in some implementations, a computer executes a modified version of the greedy, orthogonal matching pursuit algorithm (OMP) that approximates the $l_0$ problem. This modified version uses (1) non-negativity constraints, and (2) proximity constraints.

For non-negativity, two modifications are made to OMP: (a) when searching for the next atom, consider only positive projections or inner products, and (b) when updating the residual error, use a solver to impose a positivity constraint on the coefficients.

The proximity constraints are imposed as follows: For the first projection, allow OMP to proceed without modifications. After the first atom has been computed, the subsequent atom must be in proximity to the leading atom in the sense that the columns are near one another in the matrix H. In practice, this involves enforcing a Gaussian penalty on the residual error. This can be formulated as a maximum a posteriori (MAP) estimation problem:

$$\underset{x}{\mathrm{argmax}}\, p(x\,|\,y) \propto \underset{x}{\mathrm{argmax}}\, \underbrace{p(y\,|\,x)}_{likelihood}\underbrace{p(x)}_{prior}$$

where p(y|x) is the likelihood which is a functional form of the combinatorial projection onto the dictionary, and p(x) is a prior, modelled as $$p(x) \in N(x;\mu,\sigma^2) \text{ where } \mu = x_K = 1$$

where N is the usual Normal Distribution with mean and variance $\mu$ and $\sigma^2$, respectively. Here, $x_K=1$ represents the column index of the first atom.

In illustrative implementations of this invention, the prior is a physics-inspired heuristic that is carefully chosen in the context of binary codes and by extension the knowledge of the convolution kernel.

Deconvolution for Time Profile Movies

In a transient movie each pixel can be represented as a time profile vector which encodes intensity as a function of time. For a time-of-flight camera, the analogue is a phase profile vector, or in other words the environment function ξ[t]. In the discussion above (regarding a sparse formulation), ξ[t] is assumed to be a sparse function resulting from a few objects at finite depths. However, in the case of global illumination and scattering, the environment response is a non-sparse function (see FIG. 4C). In some implementations of this invention, in order to create a transient movie in the context of global illumination, Tikhonov regularization is used for the deconvolution problem. For example, in some implementations, the deconvolution problem is solved in the framework of Hodrick-Prescott filtering which can be thought of Tikhonov regularization with a smoothness prior:

$$\underset{x}{\mathrm{argmin}}\|y - Hx\|_2^2 + \lambda\|Dx\|_2^2,$$

where D is a second order difference matrix with circulant Toeplitz structure and $\lambda$ is the smoothing parameter. Generalized Cross-Validation is used to select the optimal value of $\lambda$.

In some implementations of this invention (e.g., in which the environmental function is not sparse), a computer performs Wiener deconvolution with smoothness constraints (rather than sparse deconvolution with sparseness constraints) to solve for the time profile.

In some implementations, a Hodrick-Prescott filter is used to approximate a Weiner deconvolution. However, Weiner deconvolution in this invention is not limited to a Hodrick-Prescott filter. In some implementations, other algorithms or filters are used for Weiner deconvolution.

Code Strategies

In illustrative implementations of this invention, a symmetric coding strategy is employed: that is, the same code is used for r(t) and i(t). Because the smearing matrix in equation 4 is Toeplitz, its eigenvalues correspond to spectral amplitudes. Since the condition number relates the maximal and minimal eigenvalues, a low condition number in this context corresponds to a broadband spectrum.

In illustrative implementations of this invention, the codes used for r(t) and i(t) are maximum-length sequences (m-sequences). The m-sequences are pseudorandom binary sequences (PN-sequences). PN-sequences are deterministic, yet have a flat spectrum typical of random codes. The m-sequence is generated recursively from primitive polynomials. An advantage of m-sequences is that they have desirable autocorrelation properties. Consider an m-sequence stored in vector z with a period P:

$$a_{[z,z]}(k) \Leftrightarrow \sum_i z_i z_{i-k} = \begin{cases} 1 & k = 0 \\ \frac{1}{P} & 0 < k < P-1 \end{cases} \quad (6)$$

where $a_{[z,z]}$ defines the autocorrelation operator.

As the period length P increases the autocorrelation approaches an impulse function, which has an ideal broadband spectral response. Also, advantageously, m-sequences are easy to generate, deterministic, and spectrally flat.

In illustrative implementations, the m-sequence has these advantages, among others: (i) the code length is easy to adjust and (ii) the autocorrelation function is nearly zero outside of the peak. The length of the m-sequence is carefully chosen: too short of a sequence and the autocorrelation will be high outside the peak and too long of a code leads to a longer acquisition time. In a prototype of this invention, the following m-sequence was used: 0101110110001111100110100100001. This m-sequence had length 31 (m=5).

An m-sequence with a long period is not the only type of broadband code that can be used in this invention. In some implementations of this invention, other broadband codes are used. For example, in some embodiments, the DFT of the broadband code is perfectly flat, except for a DC component (if any). Also, for example, in some embodiments, a broadband code is chosen so as to (1) maximize the minimum of the magnitudes of the DFT values of the code, and (2) to minimize the variance of the DFT values of the code. For example, in some embodiments, a Raskar broadband code is employed. As used herein, "Raskar broadband code" means the following sequence: 1010000111000001010000110011-1101110101110010011001011. The Raskar broadband code has a low condition number. Indeed, the Raskar broadband code has a slightly lower condition number than the specific m-sequence listed above.

FIG. 5A shows portions of three different codes: (1) a conventional square code 501; (2) a Raskar broadband code 502; and (3) an m-sequence 503 (specifically, the m-sequence listed above). FIGS. 5B, 5C and 5D show (a) frequency domain spectrum, (b) autocorrelation and (c) low-pass filter (LPF) autocorrelation, respectively, for the three different correlation codes shown in FIG. 5A. Specifically: FIG. 5B shows a spectrum of a square code 511, a spectrum of a Raskar broadband code 512, and a spectrum of an m-sequence code 513. FIG. 5C shows autocorrelation of a square code 521, autocorrelaton of a Raskar broadband code 522, and autocorrelation of an m-sequence code 523. FIG. 5D shows LPF autocorrelation of a square code 531, LPF autocorrelaton of a Raskar broadband code 532, and LPF autocorrelation of an m-sequence code 533.

In illustrative implementations, the broadband or m-sequence codes lead to a well-conditioned inverse problem for Equation 4 (due to their frequency domain spectrums, see FIG. 5B).

The frequency domain spectrum (FIG. 5B) of the correlation codes affects the condition number in the linear inverse problem, discussed above. The autocorrelation function (FIG. 5C) is the autocorrelation of the corresponding bit sequence shown in FIG. 5A. In the context of physical constraints, a low pass filter smoothens out the response of the correlation function to provide the measured autocorrelation.

Square codes (e.g., 501) are used in conventional commercial implementations and lead to a substantially sinusoidal correlation function. This is a double-edged sword. While sinusoidal correlation functions allow a neat parametric method to estimate the phase—one only needs 3 samples to parameterize a sinusoid—they lead to problems of unicity and are thus not suitable for multipath scenarios (FIG. 3A). The spectra of a square code 511 has many nulls, leading to an ill-conditioned problem. Moreover, the LPF autocorrelation of a square code 531 is sinusoidal. This sinusoid creates a unicity problem.

At first glance, Delta codes (not shown in FIGS. 5A, 5B, 5C, 5D) seem promising for deconvolution as their spectrum is broadband. However, aside from the obvious issue of SNR (signal to noise ratio), it is not possible to generate a true Delta code in hardware. A narrow box function approximates a Delta code. However, in the Fourier domain this is a sinc function with characteristic nulls which makes the problem poorly conditioned.

Prototype

The following three paragraphs are a description of a prototype of this invention:

In this prototype, only one fundamental modulation frequency is used. A time-of-flight camera sends binary codes at arbitrary shifts. The sensor is a Photonic Mixer Device PMD19k-2 which has a pixel array size of 160×120. This sensor is controlled by a Stratix® III FPGA (field programmable gate array) operated at a clock frequency of 1800 MHz. Sony® SLD1239JL-54 laser diodes are used for illumination. These laser diodes are stable at the modulation frequency (50 MHz) used in this prototype. The analog pixel values are converted to 16 bit unsigned values by an ADC (analog-to-digital converter) during the pixel array readout process. The cross-correlation is measured by the PMD.

Using data acquired at a single modulation frequency, this prototype captures time profile movies of a scene.

In this prototype, the Stratix® III FPGA makes rapid sweeps between the reference and illumination signal. The modulation signals are generated on the phase lock loop (PLL) inside the Stratix® III FPGA with a configurable phase and frequency from a voltage controlled oscillator. The oscillator operates at 1800 MHz. The theoretical, best-case time resolution is calculated at 69.4 ps from the hardware specs. From a sampling perspective, this limit describes the spacing between two samples on the correlation waveform.

This invention is not limited to the prototype described in the previous three paragraphs. This invention may be implemented in many other ways.

Examples of Hardware and Methods

In some examples of this invention, the FPGA supports oscillation frequencies higher than 1800 MHz. For example, a Kintex® 7 FPGA supports frequencies up to 2133 MHz, which would theoretically allow for a time resolution of 58.6 ps. In illustrative implementations of this invention, the higher the oscillation frequency, the better the time resolution.

In some embodiments, this invention calculates scene depths and visualizes light sweep images in real time. In some embodiments with this real-time performance, one or more of the following features are present: (a) a sampling period of less than 60 ps, (b) a compressed sensing approach to sampling time profiles; and (c) electronic hardware (such as an FPGA, integrated circuit or signal processor) optimized for rapid execution of readout, correlation calculation, or sparse deconvolution.

In some implementations, hardware for this invention includes: (1) a pulsed light source with 50 MHz bandwidth; (b) a lock-in CMOS ToF sensor; and (c) a microcontroller or FPGA. The software on the microcontroller or FPGA handles the read-out from the sensor and strobes the illumination in a coded pattern. To sample the correlation waveform the FPGA software quickly shifts either the reference or illumination codes. The light source illuminates the scene with amplitude modulated light. The image sensor converts the returning light into electrons. The number of electrons collected at each pixel is converted into a digital value through an ADC. Data processing of the digital frames convert the frames into a range and amplitude image.

Figure 6:
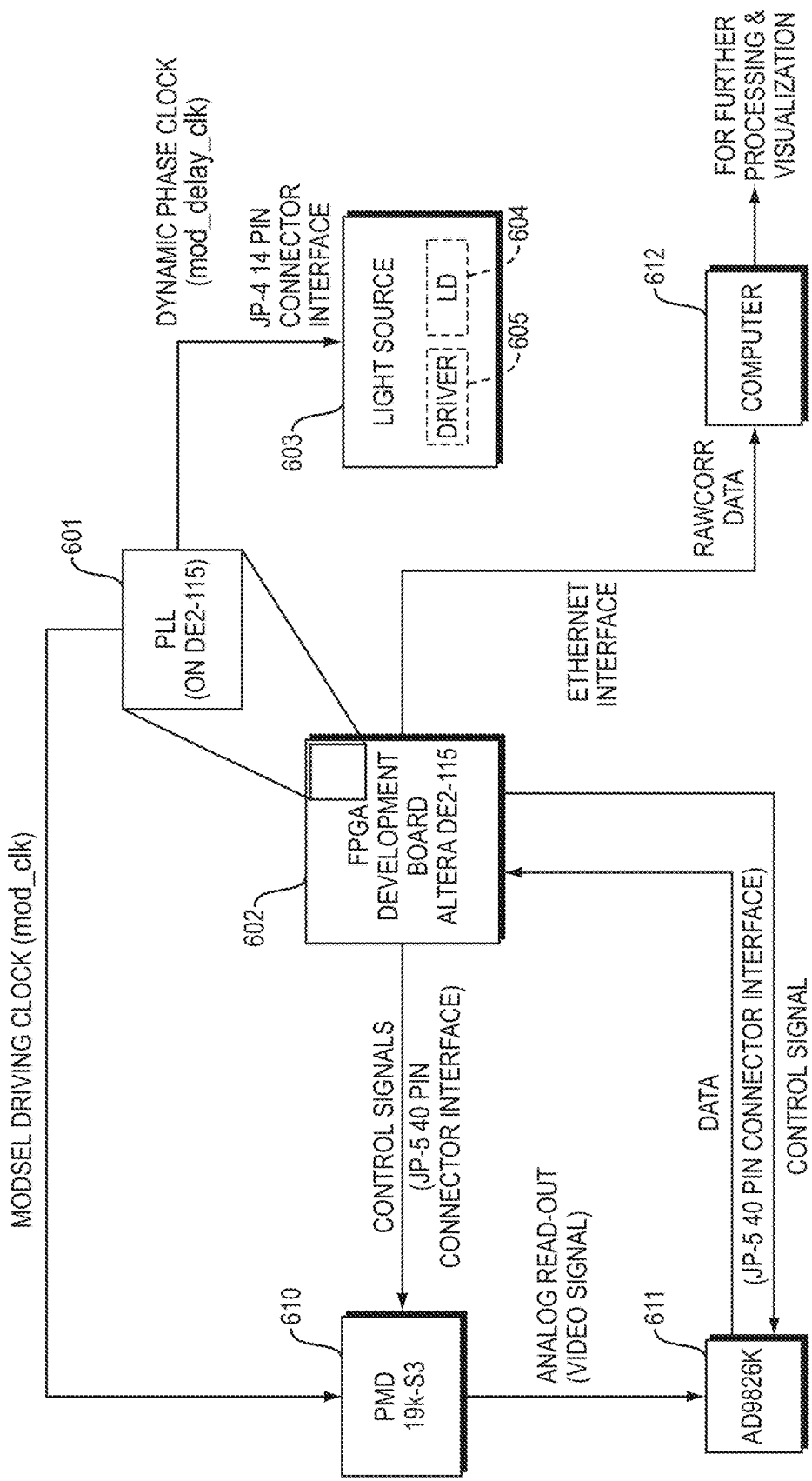
FIG. 6 is a diagram of hardware components, in an illustrative implementation of this invention.

FIG. 6 is a diagram of hardware components, in an illustrative implementation of this invention. A phase lock loop (PLL) 601 on an FPGA 602 generates a modulation signal to control amplitude modulation of an illumination source 603. In some cases, the illumination source 603 comprises one or more laser diodes 604 and a driver 605. In other cases, the light source 603 comprises LEDs. The PLL also generates a reference signal for a light sensor (e.g., a Photonic Mixer Device) 610. Analog pixel values from the sensor 610 are processed by a signal processing integrated circuit 611, which includes an ADC. The FPGA 602 sends correlation data to a computer 612 for further processing and visualization.

In illustrative implementations of this invention, there is a relative delay between reference and illumination codes. Either code can be delayed. In some embodiments, the reference code is delayed and the illumination code is not delayed. In other embodiments, the illumination code is delayed, and the reference code is not delayed. In other embodiments, both the reference code and the illumination code are delayed, but by different amounts. In the example shown in FIG. 6, the delay electronics are implemented with a PLL on the FPGA. Alternately, in some embodiments, separate delay electronics are used.

In illustrative implementations, light emitted by a light source is amplitude modulated. In these implementations, the radiant power of the light is modulated. For example, the modulation frequency (frequency of the periodic signal formed by modulating the radiant power of the light source) may be 1800 MHz. The modulation frequency of the light is not the same as the frequency band (aka color) of the light which is being modulated. For example, if the light source emits blue visible light in a frequency band from 610-670 terahertz, and the radiant power of the light source is modulated (e.g., strobed) at 1800 MHz, then the modulation frequency is 1800 MHz. Put differently, the color of the light is a carrier frequency and the amplitude modulation frequency is an envelope frequency.

Figure 7:
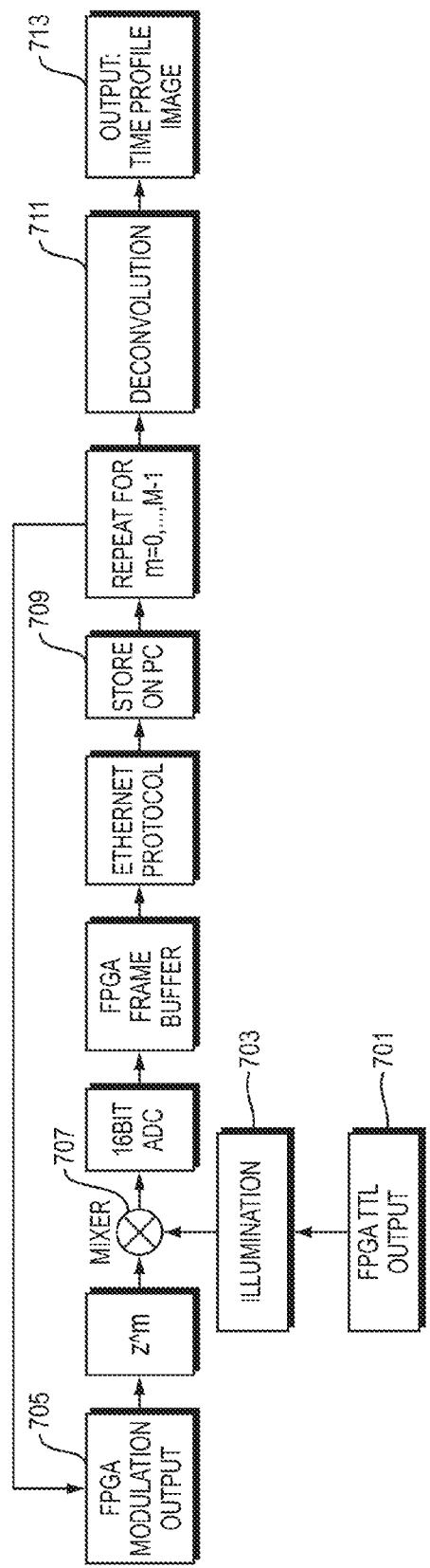
FIG. 7 is a flow chart, showing steps in an illustrative implementation of this invention.

FIG. 7 is a flow chart, showing steps in an illustrative implementation of this invention. In the example shown in FIG. 7, a light source (such as laser diodes or LEDs) emits amplitude-modulated light 703 to illuminate a scene. Modulation of the light source (and the emitted light) is controlled by an electronic modulation signal 701 generated by FGPA TTL (transistor-transistor logic). Light reflects back from the scene to a light sensor (i.e., mixer 707). The mixer 707 is a PMD implemented using CMOS photogates. The mixer 707 receives a reference signal 705 from the FPGA. The mixer 707 computes per pixel values of the cross-correlation of the reference signal 705 and optical measurements of light reflected from the scene. In FIG. 7, M is the total number of frames. In FIG. 7, m is the delay, and ranges from 0 to M−1. A computer uses deconvolution 711 to compute a time profile image 713. The type of deconvolution 711 that is used may vary. For example, in some implementations: (a) if the environmental function is sparse, then the deconvolution 711 comprises sparse deconvolution; and (b) if the environmental function is not sparse, then the deconvolution 711 comprises Wiener deconvolution.

In illustrative implementations, the reference signal and modulation signal are symmetric, and are broadband codes.

Figure 8A:
FIGS. 8A and 8B show examples of an analog light sensor and digital light sensor, respectively.
Figure 8B:

In illustrative implementations of this invention, either an analog or a digital light sensor may be used to measure light reflected from the scene. FIGS. 8A and 8B show examples of an analog light sensor 801 and digital light sensor 803, respectively. For example, analog light sensor 801 may have analog lock-in pixels, or may comprise an analog photonic mixer device. For example, digital light sensor 803 may utilize single-photon avalanche diodes for single-photon synchronous detection.

Examples of Applications

Figure 9:
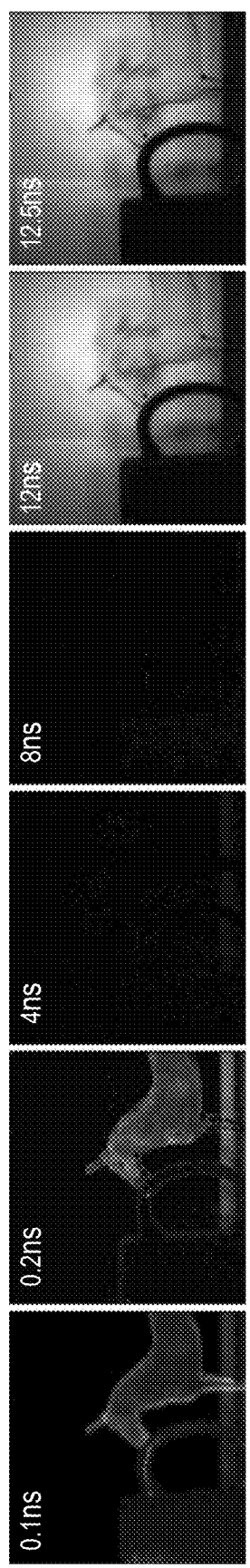
FIG. 9 shows frames of a movie of light sweeping over the second scene (with the unicorn).

FIG. 9 shows frames of a movie of light sweeping over the scene shown in FIG. 2 (with the cup and unicorn). The scene is spatially static. Each frame of the movie is a digital image calculated from a light sweep image. In the scene, a near-transparent acrylic unicorn is positioned 2 meters in front of a wall. A 10 ns gap in time occurs between light sweeping over the unicorn and the back wall. The number "13" printed on the back wall is only visible at later time-slots, while the body of the unicorn is opaque at early time slots. In the first frame (0.1 ns), specularities are visible in the unicorn. In the second frame (0.2 ns), the specularities have disappeared and only global illumination of the unicorn persists. By using sparse deconvolution and solving the multipath problem, a computer calculates the depth of the unicorn or the wall behind.

Now consider global illumination (due to internal scattering). In FIG. 2, a near transparent acrylic unicorn (thickness ~5 mm) is placed 10 centimeters away from the co-located camera and light source. Approximately 2 meters behind the unicorn is an opaque white wall. Two returns from the unicorn occur—a direct reflection off the acrylic unicorn and a reflection from the back wall passing through the unicorn. The first frame of FIG. 9 is acquired at 0.1 ns, when light is starting to wash over the unicorn. The second frame of FIG. 9 is acquired at 0.2 ns. The second frame shows internal reflections of light from inside the unicorn, but not reflections from the surface of the unicorn. Observe the unicorn's leg in the second frame (0.2 nanoseconds). The leg, which was specular at 0.1 nanoseconds (first frame, FIG. 9), has now (in frame 2) decreased in intensity.

In the example shown in FIGS. 2 and 9, this invention distinguishes direct and global illumination by solving a multipath deconvolution problem.

FIGS. 10A and 10B are images of a scene captured through a diffuser. FIG. 10A is a conventional photograph, in which the image is blurred by the diffuser. FIG. 10B is a much clearer image recovered in an illustrative implementation of this invention. In the clearer image in FIG. 10B, text ("TIME-OF-FLIGHT") that was hidden by the diffuser in FIG. 10A is visible. FIG. 10B is an example of a visual display, in which light intensities at voxels at only a certain depth (and not at other depths) in a light sweep image are displayed. By deconvolving and visualizing the amplitude of the Dirac from the back wall, the computer makes the hidden text visible.

Computers

In exemplary implementations of this invention, one or more electronic computers (e.g. 205, 602, 612, 709) are specially adapted: (1) to control the operation of, or interface with, hardware components of a ToF camera (including any light source and any light sensor) or of a display screen; (2) to select or calculate any m-sequence or other broadband code, (3) to perform any calculation described above, including any convolution, correlation or sparse deconvolution algorithm; (4) to receive signals indicative of human input, (5) to output signals for controlling transducers for outputting information in human perceivable format, and (6) to process data, to perform computations, to execute any algorithm or software, and to control the read or write of data to and from memory devices. The one or more computers may be in any position or positions within or outside of the ToF camera. For example, in some cases (a) at least one computer is housed in or together with other components of the ToF camera, such as the imaging sensor, and (b) at least one computer is remote from other components of the ToF camera. The one or more computers may be connected to each other or to other components in the ToF camera either: (a) wirelessly, (b) by wired connection, or (c) by a combination of wired and wireless connections.

In exemplary implementations, one or more computers are programmed to perform any and all algorithms described herein, and any and all functions described in the immediately preceding paragraph. For example, in some cases, programming for a computer is implemented as follows: (a) a machine-accessible medium has instructions encoded thereon that specify steps in an algorithm; and (b) the computer accesses the instructions encoded on the machine-accessible medium, in order to determine steps to execute in the algorithm. In exemplary implementations, the machine-accessible medium comprises a tangible non-transitory medium. In some cases, the machine-accessible medium comprises (a) a memory unit or (b) an auxiliary memory storage device. For example, while a program is executing, a control unit in a computer may fetch the next coded instruction from memory.

Clarification

To say that a signal is "broadband" means that the signal is broadband in the Fourier frequency domain.

Definitions

The terms "a" and "an", when modifying a noun, do not imply that only one of the noun exists.

Here are some non-limiting examples of a "camera": (a) an optical instrument that records images; (b) a digital camera; (c) a video camera; (d) a camera that uses photographic film or a photographic plate; (e) a light field camera; (f) an imaging system, (g) a light sensor; (h) a time-of-flight camera; (h) apparatus that includes a light sensor or an array of light sensors; and (i) apparatus for gathering data about light incident on the apparatus. The term "camera" includes any computers that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. For example, in some cases, a "computer"

comprises: (a) a central processing unit, (b) an ALU (arithmetic/logic unit), (c) a memory unit, and (d) a control unit that controls actions of other components of the computer so that encoded steps of a program are executed in a sequence. For example, in some cases, the term "computer" also includes peripheral units, including an auxiliary memory storage device (e.g., a disk drive or flash memory). However, a human is not a "computer", as that term is used herein.

The term "contain" (and grammatical variations thereof) shall be construed as if followed by "without limitation". If A contains B, then A contains B and may contain other things.

"Defined Term" means a term that is set forth in quotation marks in this Definitions section.

"DFT" means Discrete Fourier Transform.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

A "flat spectrum signal" means a signal, such that (a) the signal is an m-sequence, (b) the DFT of the signal does not include any component that is zero-valued and between two peaks of the DFT, or (c) the maximum magnitude of the DFT does not exceed the minimum magnitude of the DFT by more than 1000 decibels.

"For instance" means for example.

"Frame" shall be construed broadly. For example, the term "frame" includes measured data about a scene that is captured by a camera during a single time period or single exposure, even if (i) the data is not humanly perceptible, (ii) the data has not been computationally processed, and (iii) there is not a one-to-one mapping between the data and the scene being imaged.

"Herein" means in this document, including text, specification, claims, abstract, and drawings.

The terms "horizontal" and "vertical" shall be construed broadly. For example, "horizontal" and "vertical" may refer to two arbitrarily chosen coordinate axes in a Euclidian two dimensional space, regardless of whether the "vertical" axis is aligned with the orientation of the local gravitational field. For example, a "vertical" axis may oriented along a local surface normal of a physical object, regardless of the orientation of the local gravitational field.

Unless the context clearly indicates otherwise: (1) the term "implementation" means an implementation of this invention; (2) the term "embodiment" means an embodiment of this invention; and (3) the term "cases" means implementations of this invention.

The term "include" (and grammatical variations thereof) shall be construed as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

A "light sweep image" means a set of data that: (a) is calculated from measurements, taken by a ToF sensor, of light reflected from a scene; and (b) specifies, for one or more pixels in the ToF sensor, light intensity at multiple depths in the scene.

As used herein, (i) a single scalar is not a "matrix", and (ii) a rectangular array of entries, all of which are zero (i.e., a so-called null matrix), is not a "matrix".

"Mixed pixel" means a pixel in a light sensor, which pixel receives light from points at different depths in a scene.

To "multiply" includes to multiply by an inverse. Thus, to "multiply" includes to divide.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

As used herein, the term "set" does not include a so-called empty set (i.e., a set with no elements). Mentioning a first set and a second set does not, in and of itself, create any implication regarding whether or not the first and second sets overlap (that is, intersect).

As used herein, a "subset" of a set consists of less than all of the elements of the set.

"Some" means one or more.

To say that a signal is "substantially sinusoidal" means that, if the signal were sampled at least 1000 times per period at equally spaced time intervals, then for each sample during an entire period of the signal, the value of the signal would be equal to that of an ideal sinusoidal wave, plus or minus 10% of the amplitude of the ideal sinusoidal wave.

To say that a signal is "substantially square" means that, if the signal were sampled at least 1000 times per period of the signal at equally spaced time intervals, then for at least 90% of the samples in a period of the signal, the value of the signal would be equal to that of an ideal square wave, plus or minus 10% of the amplitude of the ideal square wave.

"Such as" means for example.

"Time-of-flight camera" or "ToF camera" means a camera that takes measurements that are dependent on a phase difference, the phase difference being between a phase of light emitted by the camera and a phase of light reflected back to the camera.

A "time-of-flight sensor" or "ToF sensor" means a sensor of a ToF camera, which sensor takes measurements that are dependent on a phase difference, the phase difference being between a phase of light emitted by the ToF camera and a phase of light reflected back to the ToF camera.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

A matrix may be indicated by a bold capital letter (e.g., D). A vector may be indicated by a bold lower case letter (e.g., $\alpha$). However, the absence of these indicators does not indicate that something is not a matrix or not a vector.

Except to the extent that the context clearly requires otherwise, if steps in a method are described herein, then: (1) steps in the method may occur in any order or sequence, even if the order or sequence is different than that described; (2) any step or steps in the method may occur more than once; (3) different steps, out of the steps in the method, may occur a different number of times during the method, (4) any step or steps in the method may be done in parallel or serially; (5) any step or steps in the method may be performed iteratively; (6) a given step in the method may be applied to the same thing each time that the particular step occurs or may be applied to different things each time that the given step occurs; and (7) the steps described are not an exhaustive listing of all of the steps in the method, and the method may include other steps.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, or possessive forms, or different declensions, or different tenses. In each case described in this paragraph, Applicant is acting as Applicant's own lexicographer.

Variations

This invention may be implemented in many different ways. Here are some non-limiting examples:

In one aspect, this invention is a method comprising, in combination: (a) using an electrical signal to control modulation of a light source, such that the light source illuminates a scene, the electrical signal is periodic, and each period of the electrical signal comprises an m-sequence; (b) using a ToF sensor to take measurements of light that is incident on the ToF sensor and reflected from the scene; and (c) using one or more computers to perform an algorithm that takes the measurements as input and that calculates per-pixel depth data, which depth data specifies multiple scene depths for each pixel in a set of mixed pixels. In some cases, the algorithm performs sparse deconvolution. In some cases, the algorithm includes Weiner deconvolution or Hodrick-Prescott filtering. In some cases, the measurements occur entirely during a time period in which the light source emits light at a single fundamental modulation frequency and not at any other fundamental modulation frequency. In some cases: (a) the ToF sensor has a correlation waveform that is the cross-correlation of (i) a reference signal that controls modulation of gain of pixels of the ToF sensor and (ii) received light at the ToF sensor; and (b) the correlation waveform is not substantially sinusoidal. In some cases: (a) the one or more computers calculate a light sweep image; (b) the one or more computers use the light sweep image to calculate values of control signals for controlling a digital image displayed on a screen; (c) the digital image includes light intensities for voxels at a specific depth of the scene, but not at other depths in the scene; and (d) one or more of the voxels correspond to a scene position that is viewable from the ToF sensor only through a diffuser. Each of the cases described above in this paragraph is an example of the method described in the first sentence of this paragraph, and is also an example of an embodiment of this invention that may be combined with other embodiments of this invention.

In another aspect, this invention is an apparatus comprising, in combination: (a) a light source, (b) a ToF sensor; (c) a set of one or more computer processors; and (d) machine-accessible media; wherein (i) the machine-accessible media do not comprise a transitory signal, and (ii) the machine-accessible media have instructions encoded thereon for the set of processors (A) to generate an electrical signal to control modulation of a light source, such that the electrical signal comprises an m-sequence, and (B) to perform an algorithm that takes, as an input, measurements by the ToF sensor, and that calculates, for each pixel in a set of mixed pixels, multiple depths in the scene. In some cases, the algorithm involves sparse deconvolution. In some cases, the algorithm involves Wiener deconvolution or Hodrick-Prescott filtering. In some cases, at least one pixel in the ToF sensor comprises a lock-in pixel. In some cases, at least one pixel in the ToF sensor comprises a single-photon avalanche diode. Each of the cases described above in this paragraph is an example of the apparatus described in the first sentence of this paragraph, and is also an example of an embodiment of this invention that may be combined with other embodiments of this invention.

In another aspect, this invention is a method comprising, in combination: (a) using an electrical signal to control modulation of a light source, such that the light source illuminates a scene and that at least a portion of the electrical signal comprises a flat spectrum signal; (b) using a ToF sensor to take measurements of light that is incident on the ToF sensor and reflected from the scene; and (c) using one or more computers to perform an algorithm that takes the measurements as input and that calculates per-pixel depth data, which depth data specifies multiple scene depths for each pixel in a set of mixed pixels. In some cases, the algorithm performs sparse deconvolution. In some cases, the electrical signal is not substantially square. In some cases, the measurements occur entirely during a time interval in which the light source emits light at a single fundamental modulation frequency and not at any other fundamental modulation frequency. In some cases: (a) the ToF sensor has a correlation waveform that is the cross-correlation of (i) a reference signal that controls modulation of gain in pixels of the ToF sensor and (ii) received light at the ToF sensor; and (b) the correlation waveform is not substantially sinusoidal. In some cases: (a) the one or more computers calculate a light sweep image; (b) the one or more computers use the light sweep image to calculate values of control signals for controlling a digital image displayed on a screen; (c) the digital image includes light intensities for voxels at a specific depth of the scene, but not at other depths in the scene; and (d) one or more of the voxels correspond to a scene position that is viewable from the ToF sensor only through a diffuser. Each of the cases described above in this paragraph is an example of the method described in the first sentence of this paragraph, and is also an example of an embodiment of this invention that may be combined with other embodiments of this invention.

In another aspect, this invention is an apparatus comprising, in combination: (a) a light source for emitting light to illuminate a scene, which light undergoes modulation; (b) a ToF sensor; and (c) one or more computers for (i) generating an electrical signal to control the modulation, such that the electrical signal is periodic and each period of the electrical signal comprises a flat spectrum signal, and (ii) performing an algorithm that calculates a depth map of the scene, which depth map specifies, for each pixel in a set of mixed pixels of the ToF sensor, multiple depths in the scene. In some cases, the algorithm involves sparse deconvolution. In some cases, the algorithm involves Wiener deconvolution or Hodrick-Prescott filtering. Each of the cases described above in this paragraph is an example of the apparatus described in the first sentence of this paragraph, and is also an example of an embodiment of this invention that may be combined with other embodiments of this invention.

While exemplary implementations are disclosed, many other implementations will occur to one of ordinary skill in the art and are all within the scope of the invention. Each of the various embodiments described above may be combined with other described embodiments in order to provide multiple features. This invention includes not only the combination of all identified features but also includes each combination and permutation of one or more those features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also within the scope of the present invention. Numerous modifications may be made by one of ordinary skill in the art without departing from the scope of the invention.

What is claimed is:

1. A method comprising, in combination:
   (a) an electrical signal controlling modulation of a light source, such that the light source illuminates a scene, the electrical signal is periodic, and each period of the electrical signal comprises an m-sequence;
   (b) a time-of-flight (ToF) sensor taking measurements of light that is incident on the ToF sensor and reflected from the scene; and
   (c) one or more computers performing an algorithm that takes the measurements as input and that calculates multiple scene depths in the scene for each pixel in a set of mixed pixels;
   wherein
   (i) the one or more computers calculate a light sweep image, and
   (ii) the one or more computers calculate, based on the light sweep image, values of control signals which control a digital image displayed on a screen, such that
      (A) the digital image includes light intensities for voxels at a specific depth of the scene, but not at other depths in the scene, and
      (B) one or more of the voxels correspond to a scene position that is viewable from the ToF sensor only through a diffuser.

2. The method of claim 1, wherein the algorithm performs sparse deconvolution.

3. The method of claim 1, wherein the algorithm includes Weiner deconvolution or Hodrick-Prescott filtering.

4. The method of claim 1, wherein the scene is static during the modulation and during the measurements.

5. The method of claim 1, wherein:
   (a) the ToF sensor has a correlation waveform that is the cross-correlation of (i) a reference signal that controls modulation of gain of pixels of the ToF sensor and (ii) received light at the ToF sensor; and
   (b) the correlation waveform is not substantially sinusoidal.

6. Apparatus comprising, in combination:
   (a) a light source,
   (b) a time-of-flight (ToF) sensor;
   (c) a set of one or more computer processors; and
   (d) machine-accessible media;
   wherein
   (i) the machine-accessible media do not comprise a transitory signal, and
   (ii) the machine-accessible media have instructions encoded thereon for the set of processors
      (A) to generate an electrical signal to control modulation of a light source, such that the electrical signal comprises an m-sequence, and
      (B) to perform an algorithm that takes, as an input, measurements by the ToF sensor, and that calculates, for each pixel in a set of mixed pixels, multiple depths in a scene,
      (C) to calculate a light sweep image, and
      (D) to calculate, based on the light sweep image, values of control signals which control a digital image displayed on a screen, such that
         (I) the digital image includes light intensities for voxels at a specific depth of the scene, but not at other depths in the scene, and
         (II) one or more of the voxels correspond to a scene position that is viewable from the ToF sensor only through a diffuser.

7. The apparatus of claim 6, wherein the algorithm involves sparse deconvolution.

8. The apparatus of claim 6, wherein the algorithm involves Wiener deconvolution or Hodrick-Prescott filtering.

9. The apparatus of claim 6, wherein at least one pixel in the ToF sensor comprises a lock-in pixel.

10. The apparatus of claim 6, wherein at least one pixel in the ToF sensor comprises a single-photon avalanche diode.

11. The apparatus of claim 6, wherein the algorithm involves sparse deconvolution.

12. The apparatus of claim 6, wherein the algorithm involves Wiener deconvolution or Hodrick-Prescott filtering.

13. A method comprising, in combination:
   (a) an electrical signal controlling modulation of a light source, such that the light source illuminates a scene and that at least a portion of the electrical signal comprises a flat spectrum signal;
   (b) a time-of-flight (ToF) sensor taking measurements of light that is incident on the ToF sensor and reflected from the scene; and
   (c) one or more computers performing an algorithm that takes the measurements as input and that calculates multiple scene depths for each pixel in a set of mixed pixels; wherein
   (i) the one or more computers calculate a light sweep image, and (ii) the one or more computers calculate, based on the light sweep image, values of control signals which control a digital image displayed on a screen, such that
   (A) the digital image includes light intensities for voxels at a specific depth of the scene, but not at other depths in the scene, and
   (B) one or more of the voxels correspond to a scene position that is viewable from the ToF sensor only through a diffuser.

14. The method of claim 13, wherein the algorithm performs sparse deconvolution.

15. The method of claim 13, wherein the electrical signal is not substantially square.

16. The method of claim 13, wherein the scene is static during the modulation and during the measurements.

17. The method of claim 13, wherein:
(a) the ToF sensor has a correlation waveform that is the cross-correlation of (i) a reference signal that controls modulation of gain in pixels of the ToF sensor and (ii) received light at the ToF sensor; and
(b) the correlation waveform is not substantially sinusoidal.

18. Apparatus comprising, in combination:
(a) a light source configured to emit light that illuminates a static scene, which light undergoes modulation;
(b) a time-of-flight (ToF) sensor; and
(c) one or more computers that are programmed
   (i) to output an electrical signal that controls the modulation, such that the electrical signal is periodic and each period of the electrical signal comprises a flat spectrum signal, and
   (ii) to perform an algorithm that calculates a depth map of the scene, which depth map specifies, for each pixel in a set of mixed pixels of the ToF sensor, multiple depths in the scene,
   (iii) to calculate a light sweep image, and
   (iv) to calculate, based on the light sweep image, values of control signals which control a digital image displayed on a screen, such that
      (I) the digital image includes light intensities for voxels at a specific depth of the scene, but not at other depths in the scene, and
      (II) one or more of the voxels correspond to a scene position that is viewable from the ToF sensor only through a diffuser.

* * * * *